(12) United States Patent
Anderson et al.

(10) Patent No.: US 11,582,897 B2
(45) Date of Patent: Feb. 21, 2023

(54) BRACKET SYSTEM (71) Applicant: CNH Industrial America LLC, New Holland, PA (US)

(72) Inventors: Brian John Anderson, Yorkville, IL (US); Kregg Raducha, Chicago, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 358 days.

(21) Appl. No.: 16/733,769

(22) Filed: Jan. 3, 2020

(65) Prior Publication Data

US 2021/0204468 A1 Jul. 8, 2021

(51) Int. Cl.
*A01C 7/08* (2006.01)
*A01C 7/10* (2006.01)

(52) U.S. Cl.
CPC ............... *A01C 7/08* (2013.01); *A01C 7/105* (2013.01)

(58) Field of Classification Search
CPC .. A01C 7/08; A01C 7/00; A01C 7/105; A01C 7/102; A01C 7/10
See application file for complete search history.

(56) References Cited

U.S. PATENT DOCUMENTS

| 4,023,707 | A | 5/1977 | Johnson |
| 4,289,256 | A | 9/1981 | Bailey |
| 5,074,228 | A | 12/1991 | Daws |
| 5,078,066 | A | 1/1992 | Lafferty |
| 6,138,591 | A | 10/2000 | Horsch |
| 8,656,848 | B2 | 2/2014 | Hubalek et al. |
| 8,701,576 | B2 | 4/2014 | Friggstad |
| 9,043,951 | B2 | 6/2015 | Tolstedt et al. |
| 9,578,801 | B2 | 2/2017 | Barsi et al. |
| 9,781,875 | B2 | 10/2017 | Riffel |

FOREIGN PATENT DOCUMENTS

| DE | 4004967 C2 | 3/1989 |
| EP | 1752031 A1 | 8/2005 |
| WO | 2015020595 A1 | 2/2015 |

OTHER PUBLICATIONS

Larocque, Controlled Traffic Farming, Final Report Nuffield Study Tour, Mar. 2012.
Setting common runlines for machinery in a controlled traffic farming (CTF) system, Nov. 14, 2018.

*Primary Examiner* — Christopher J. Novosad
(74) *Attorney, Agent, or Firm* — Rebecca Henkel; Rickard DeMille (57) ABSTRACT

An agricultural system that includes a planter frame. A track and/or wheel couple to and support the planter frame. A first row unit bracket couples to the planter frame. A first offset bracket couples to the first row unit bracket. A first row unit couples to the first offset bracket. The first offset bracket offsets the first row unit from a path of the track and/or wheel.

15 Claims, 6 Drawing Sheets

BRACKET SYSTEM

BACKGROUND

The present application relates generally to agricultural implements.

Planting implements (e.g., planters) are typically towed behind a tractor across fields. These planting implements typically include multiple row units distributed across the width of the implement. These row units deposit seeds at a desired spacing and soil depth, thereby establishing rows of crops. Each row unit may include a seed meter that controls the rate and/or spacing of the seeds deposited in the ground. As the implement is pulled across fields, the tracks or wheels that support the weight of the implement compress the soil. Unfortunately, compressed soil may inhibit root growth and thus growth of the plant. Rows of seeds planted in or proximate the compressed soil may therefore have a lower crop yield.

BRIEF DESCRIPTION

In one embodiment, an agricultural system that includes a planter frame. A track and/or wheel couple to and support the planter frame. A first row unit bracket couples to the planter frame. A first offset bracket couples to the first row unit bracket. A first row unit couples to the first offset bracket. The first offset bracket offsets the first row unit from a path of the track and/or wheel.

In another embodiment, an agricultural system that includes a toolbar. A track and/or wheel couples to and supports the toolbar. A first row unit bracket couples to the toolbar. A first offset bracket couples to the first row unit bracket. The first offset bracket couples to a first row unit and offsets the first row unit from a path of the track and/or wheel. A second row unit bracket couples to the toolbar. A second offset bracket couples to the second row unit bracket. The second offset bracket couples to a second row unit and offsets the second row unit from the path of the track and/or wheel.

In another embodiment, a bracket system that includes an offset bracket that couples to a row unit bracket. The offset bracket couples to a row unit and offsets the row unit from a path of a track and/or wheel of an agricultural implement. The offset bracket includes a first row connecting plate and a second row connecting plate. The first row connecting plate and the second row connecting plate couple to the row unit. The offset bracket also includes a first bracket plate and a second bracket plate. The first bracket plate and the second bracket plate couple to the row unit bracket. The first row connecting plate and the second row connecting plate are offset from the first bracket plate and the second bracket plate.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Seed planting implements generally utilize multiple row units to plant rows of seeds in the ground. The rows of seeds are spaced from each other at distances that facilitate crop yields for a specific crop. For example, corn rows may be spaced 30 inches apart, soybean rows may be spaced 20 inches apart. The even spacing of the row units along the length of the toolbar may place one or more row units in the path of the tracks and/or wheels that support the weight of the implement. As the tracks and/or wheels move across the soil they compress the soil. Row units that follow in the path of or proximate the path traveled by the tracks and/or wheels may then plant seeds in compressed soil. Compressed soil may inhibit the growth of these seeds and therefore the plants in these rows may produce a lower yield.

In order to reposition the row units that are near the tracks and/or wheels, the implement may include a bracket system. The bracket system described below includes an offset bracket that couples to a row unit bracket on the toolbar. The offset bracket enables a row unit to couple to the toolbar but at a position that is offset from the row unit bracket. In other words, the offset bracket shifts the row unit to the left or right of the standardized row unit bracket on the toolbar. By shifting one or more row units to the left and/or right, the bracket system enables an implement to move row units away from the compressed soil created by the tracks and/or wheels of the implement. The seeds planted in these rows may therefore produce a greater yield.

Figure 1:
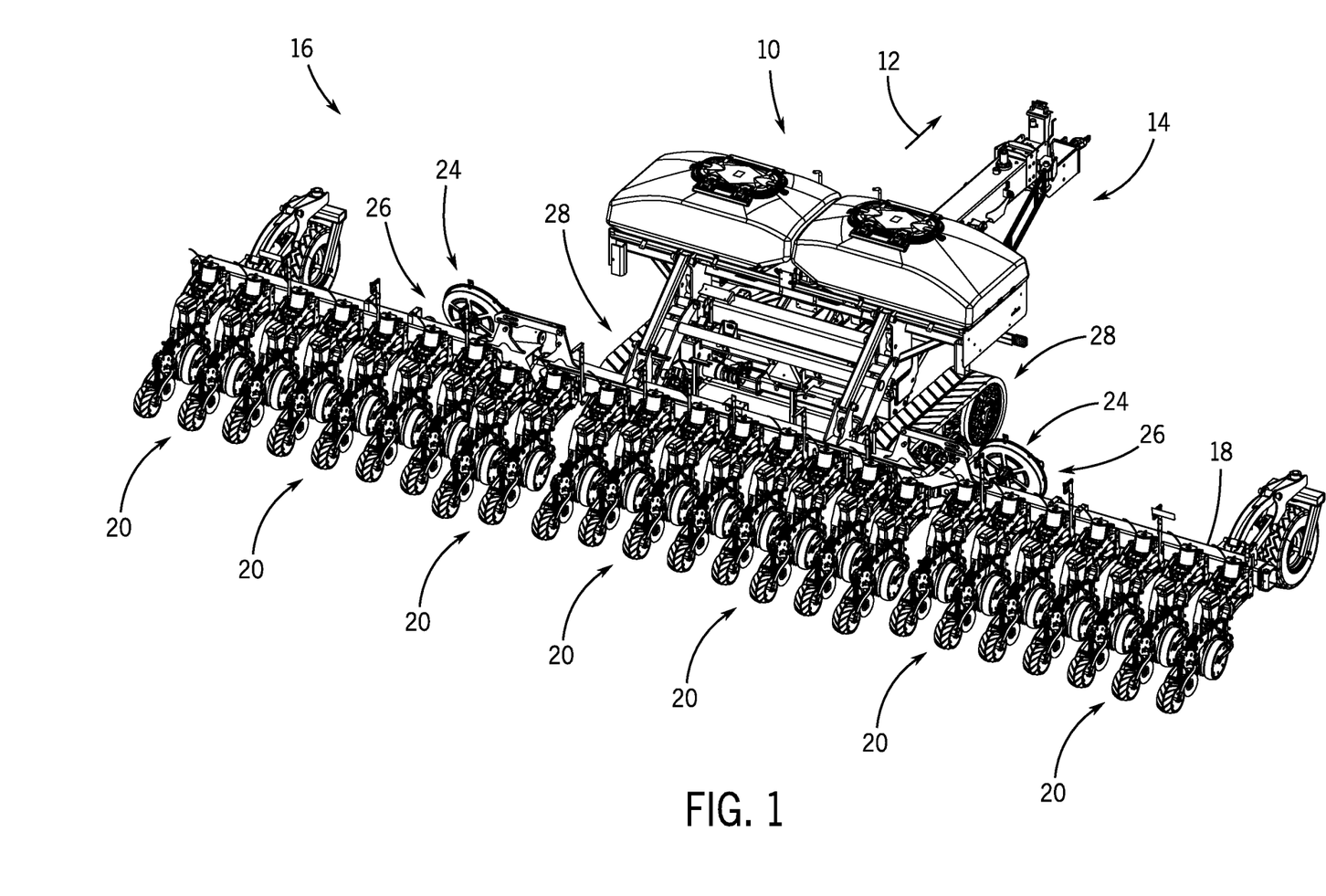
FIG. 1 is a perspective view of an agricultural implement, according to an embodiment of the disclosure.

FIG. 1 is a perspective view of an agricultural implement 10 (e.g., planting implement, agricultural system). The agricultural implement 10 includes a hitch assembly 14, a main frame assembly 16 (e.g., planter frame), a toolbar 18, row units 20, and seed tanks. In some embodiments, when a work vehicle is coupled to the implement 10 by the hitch assembly 14, the implement 10 may be towed along a direction of travel 12 by the work vehicle, such as a tractor or other prime mover.

As depicted, the hitch assembly 14 is coupled to the main frame assembly 16 and the main frame assembly 16 is coupled to the toolbar 18. Additionally, as depicted, the toolbar 18 is coupled to multiple row units 20. Thus, as the work vehicle tows the implement 10, each of the row units 20 may deposit seeds at a desired depth beneath the soil surface, thereby establishing rows of planted seeds. In some embodiments, the bulk of the seeds to be planted may be stored in seed tanks. Thus, as seeds are planted by the row units 20, a pneumatic distribution system may distribute additional seeds from the seed tanks to the individual row units 20.

It should be noted that while the illustrated implement 10 includes 24 row units, alternative implements may include more or fewer row units 20. For example, certain implements 10 may include 6, 8, 12, 16, 24, 32, 36 row units, or more. In addition, the spacing between row units may be particularly selected based on the type of seed being planting. For example, the row units may be spaced 30 inches from one another for planting corn, and 15 inches from one another for planting soy beans.

The seeds are metered through the row units 20 with a metering system that may use vacuum pressure created by a vacuum system 22. The vacuum pressure is created by one or more fans 24 (e.g., 1, 2, 3, 4, or more) that couple to the toolbar 18 with conduits 26. In operation, the fans 24 draw air out of the toolbar 18 creating a vacuum chamber. Hoses (e.g., vacuum hoses) extend between the row units 20 and the toolbar 18, which enable the vacuum pressure to transfer to the metering system. The vacuum pressure draws air through the metering system on the row units 20, and through the hoses that couple the metering system to the toolbar 18.

The weight of the implement 10 is supported by tracks 28 that couple to the frame 16 (e.g., toolbar 18). The tracks 28 may be placed at various locations along the width of the implement 10 in order to support the weight of the toolbar 18, row units 20, and other components of the implement 10. As the tracks 28 travel over the soil, the tracks 28 compress the soil. As explained above, compressed soil may inhibit plant growth and therefore crop yields. Accordingly, the implement 10 may include a bracket system that enables offsetting of one or more row units 20 in or proximate the path traveled by the tracks 28. These row units 20 may therefore plant their crops in soil that is less compressed than the soil traveled over by the tracks 28. It should be understood that while tracks are illustrated, some implements may be supported by wheels or a combination of wheels and tracks.

Figure 1A:
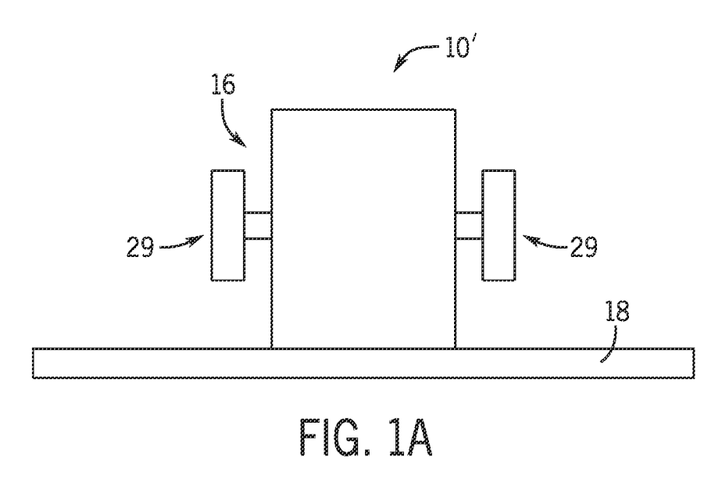
FIG. 1A is a block diagram of another agricultural implement, according to an embodiment of the disclosure.

FIG. 1A is a block diagram of another agricultural implement 10'. In the illustrated embodiment, the implement 10' includes wheels 29 coupled to the frame 16 and configured to support the frame 16 (e.g., as compared to the tracks disclosed above with regard to the implement of FIG. 1).

Figure 2:
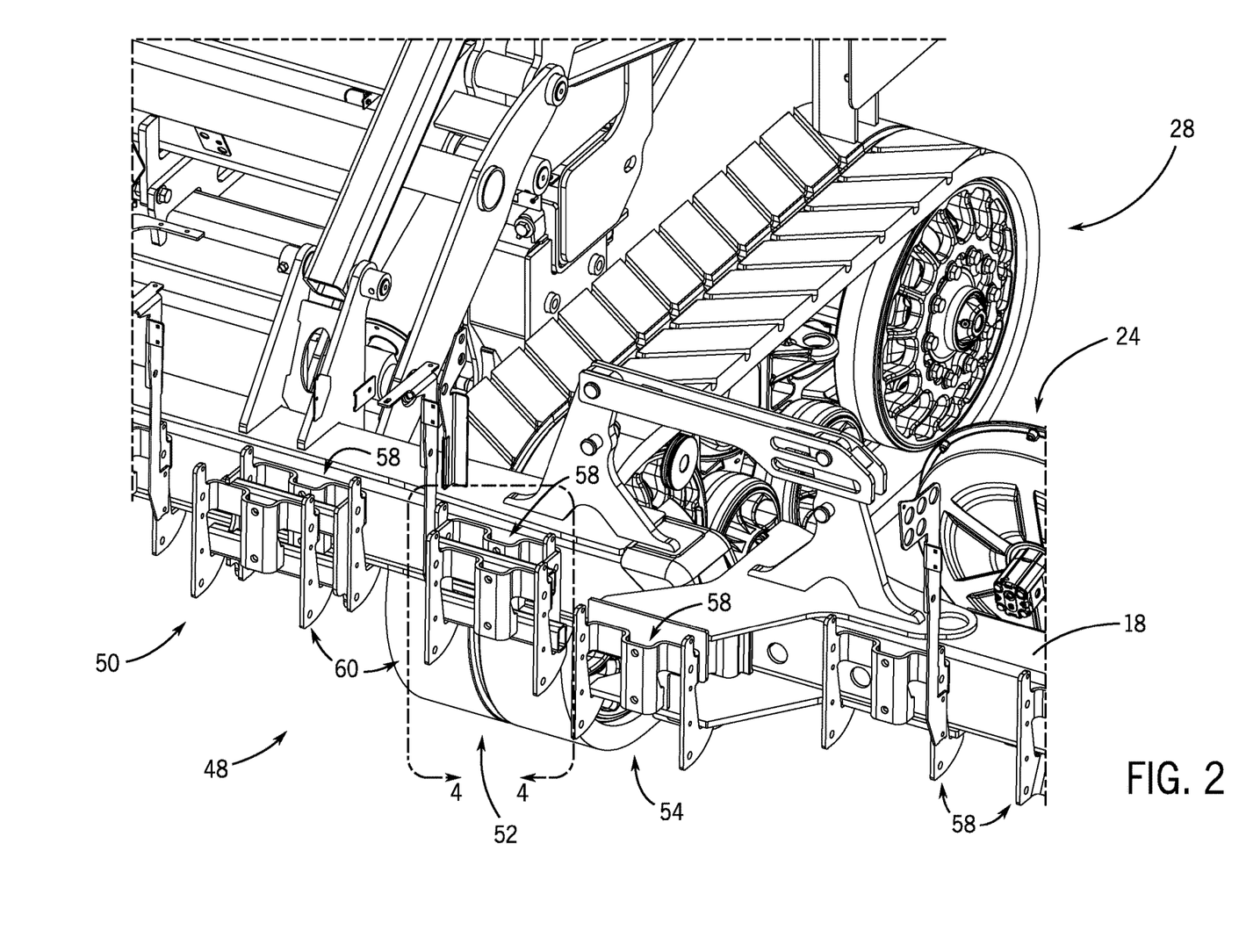
FIG. 2 is a partial rear view of the agricultural implement with row units laterally offset from a track, according to an embodiment of the disclosure.

FIG. 2 is a partial rear view of the agricultural implement 10 with row unit attachment points 48. The row unit attachment points 48 in FIG. 2 are numbered from right to left 50, 52, and 54. As illustrated, the row units 20 that attach to these attachment points 52 and 54 are on opposite sides of the track 28. It is seeds planted with these row units 20 that may be affected by soil compression of the track 28. In order to offset the row units 20 that couple to the row unit attachment points 50 and 52, respectively to the right and left of the track 28, the implement 10 includes a bracket system 56. The bracket system 56 offsets the row units 20 that couple to the row unit attachment points 50 and 52 from their standard position on the toolbar 18 and thus away from the compressed soil created by the implement 10 as the implement 10 travels across fields.

The bracket system 56 includes a row unit bracket 58 that couples to the toolbar 18 (e.g., welded) and an offset bracket 60. The row unit bracket 58 couples to and supports a respective row unit 20, thereby enabling the implement 10 to pull the row unit 20. The offset brackets 60 similarly couples to row units 20, but also couples to the row unit brackets 58. When coupled to the row unit brackets 58, the offset brackets 60 offset or shift the position of the row units 20 (e.g., row units that couple at attachment points 50 and 52) with respect to the row unit brackets 58. By offsetting or shifting the row units 20 with respect to the row unit brackets 58, the offset brackets 60 shift or offset the row units 20 that couple to the attachment points 50 and 52 to the left and right of the track 28. The row units 20 may therefore plant seeds in soil that may be less compressed than the soil traversed by the track 28 and/or wheels.

Figure 3:
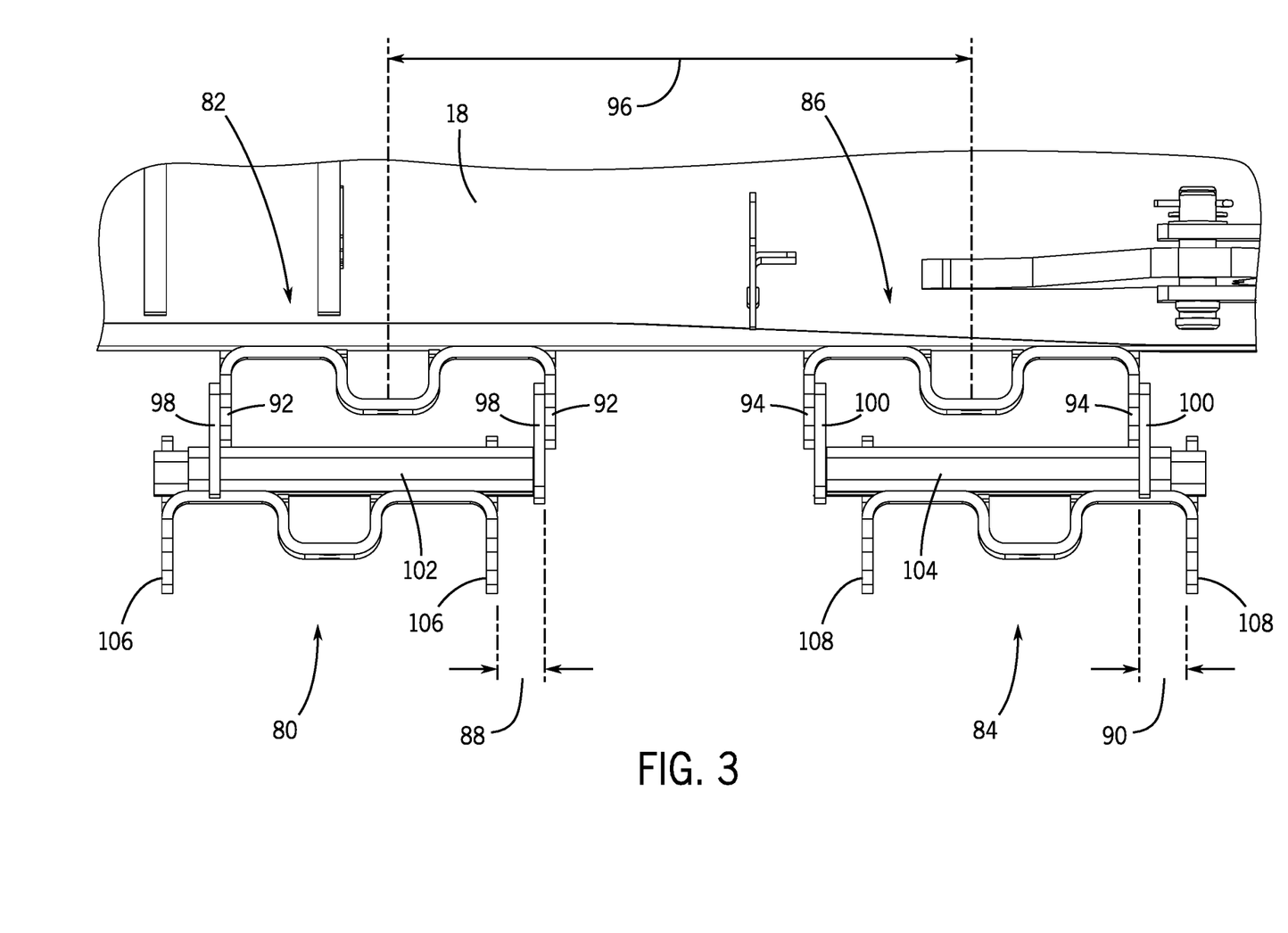
FIG. 3 is a partial top view of a toolbar with a first offset bracket and a second offset bracket, according to an embodiment of the disclosure.

FIG. 3 is a partial top view of the toolbar 18 with a first offset bracket 80 coupled to a first row unit bracket 82 and a second offset bracket 84 coupled to a second row unit bracket 86. As illustrated, the first offset bracket 80 and the second offset bracket 84 enable respective row units 20 to be shifted from the standard attachment points of the respective first row unit bracket 82 and the second row unit bracket 86. The row unit 20 that couples to the first offset bracket 80 is shifted to the left and a row unit 20 that couples to the second offset bracket 84 is shifted to the right. More specifically, the first offset bracket 80 shifts a row unit 20 to the left a distance 88, and the second offset bracket 84 shifts a row unit 20 to the right a distance 90.

The first and second row unit brackets 82, 86 define respective flanges or plates 92 and 94. These flanges 92 and 94 couple to the toolbar 18 via welds, fasteners (e.g., threaded fasteners), etc. The first and second row unit brackets 82, 86 are configured to space row units 20 a distance 96 from each other. The distance 96 may be the desired distance for particular rows of a crop (e.g., corn, soybean). However, and as explained above, the distance 96 may not be sufficient to place the row units 20 out of the path of the wheels and/or tracks of the implement 10 (i.e., compressed soil). Accordingly, the first and second offset brackets 80, 84 couple to these respective flanges 92 and 94 to increase the spacing between the row units 20 and thus block or reduce the planting of crops in and/or proximate compressed soil.

The first and second offset brackets 80 and 84 include respective bracket plates 98, 100 that couple to the respective flanges 92, 94. For example, the bracket plates 98, 100 may retroactively couple to the flanges 92, 94 (e.g., couple with welds, fasteners, threaded fasteners). The bracket plates 98, 100 couple to and support respective plates or tubes 102, 104 (e.g., square, rectangular tubes). The tubes 102, 104 in turn support row connecting plates 106 and 108. It is to these row connecting plates 106 and 108 that the row units 20 couple. The tubes 102, 104 therefore enable the row connecting plates 106, 108 to be offset from the flanges 92, 94 by the respective distances 88, 90, thus increasing the spacing between the row units 20 that couple to the first and second offset brackets 80, 84.

Figure 4:
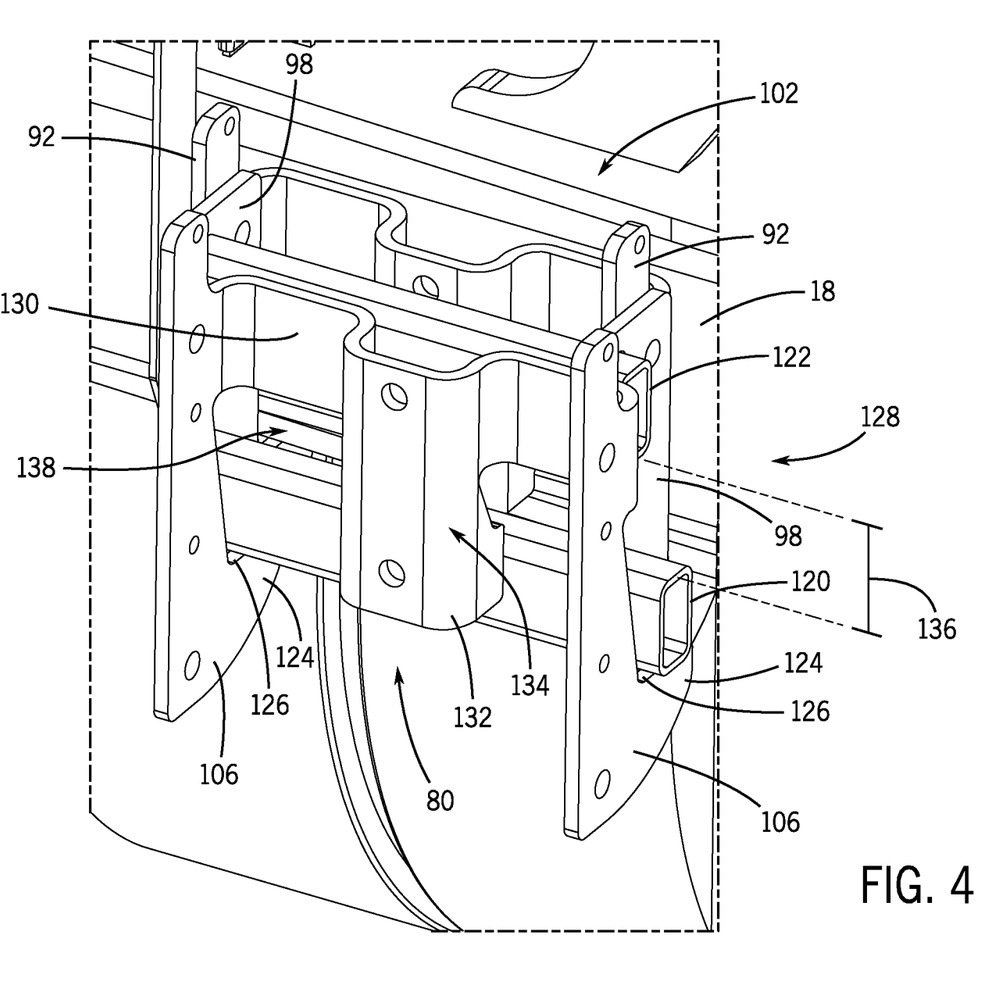
FIG. 4 is a perspective view of an offset bracket, according to an embodiment of the disclosure.

FIG. 4 is a perspective view of the offset bracket 80 coupled to the row unit bracket 82 in FIG. 3. As explained above, the offset bracket 80 includes bracket plates 98 that couple to plates or tubes 102. As illustrated, the offset bracket 80 may include a first tube 120 and a second tube 122 that extend between and couple to the row connecting plates 106. In some embodiments row connecting plates 106 may include a head 124 that forms a grove 126 that receives the first tube 120. In operation, the head 124 increases the contact area with first tube 120 and enables the row connecting plates 106 to carry and transfer the load of a row unit 20 to the tube 120, which in turn transfers the load to the bracket plates 98. The row connecting plates 106 may couple to the tubes 102 via welding, fasteners (e.g., threaded fasteners), or a combination thereof. As illustrated, the row connecting plates 106 define a plurality of apertures 128 that enable the row connecting plates 106 to couple to a row unit 20.

In some embodiments, the row connecting plates 106 couple together with a flange 130. The flange 130 and row connecting plates 106 may be one-piece. The flange 130 may be included in order to space the row connecting plates 106 by a desired distance. The flange 130 may also facilitate coupling of the row connecting plates 106 to the tube 122. For example, the flange 130 may be welded and/or coupled with fasteners (e.g., threaded fasteners) to the tube 122. In some embodiments, a bar 132 may couple to the flange 130. The bar 132 may integral or one-piece with the flange 130 or it may be separately coupled to the flange 130 (e.g., welded, coupled with fasteners). The bar 132 may couple to the tube 120 (e.g., weld, fasteners) and defines apertures 134. The apertures 134 may facilitate the coupling of a row unit 20 to the offset bracket 80. The tubes 120 and 122 are spaced apart from each other by a distance 136 to form a gap or aperture 138. The gap or aperture 138 enables one or more conduits to pass through the offset bracket 80 and to couple to a row unit 20. The conduits may enable control of a row unit 20 and/or supply material to a row unit 20. For example, a conduit may extend through the gap 138 to supply vacuum pressure to a metering system of a row unit 20.

Figure 5:
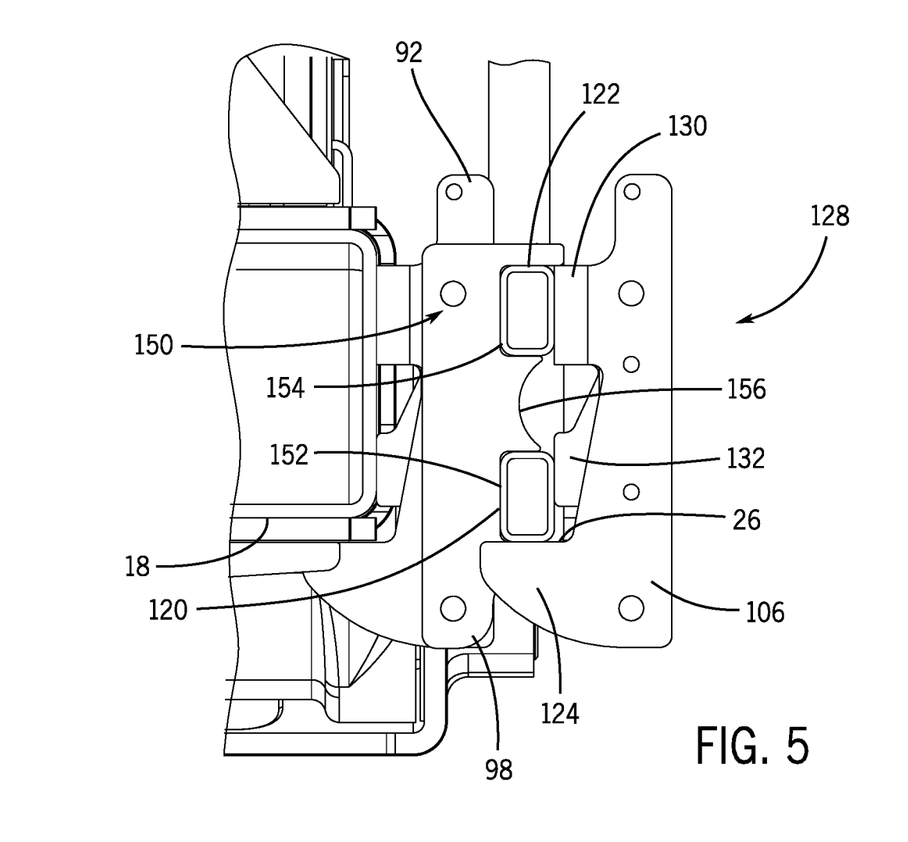
FIG. 5 is a side view of the offset bracket in FIG. 4, according to an embodiment of the disclosure.

FIG. 5 is a side view of the offset bracket 80 in FIG. 4. As explained above, the offset bracket 80 couples to the row unit bracket 82 with bracket plates 98. For example, the bracket plates 98 may define apertures 150 that enable the bracket plates 98 to couple to the flanges 92 of the row unit bracket 82. The bracket plates 98 may couple to the flanges 92 with fasteners (e.g., threaded fasteners) that enable the offset bracket 80 to couple to and be removed from the row unit bracket 82. The bracket plates 98 support and couple to the tubes 120 and 122. For example, the bracket plates 98 may define first and second grooves or recesses 152 and 154. The first groove 152 receives the first tube 120 and the second groove 154 receives the second tube 122. The grooves 152, 154 are separated by a web 156 on the bracket plates 98.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system, comprising:
    a planter frame;
    a track, a wheel, or a combination thereof, coupled to the planter frame and configured to support the planter frame;
    a first row unit bracket coupled to the planter frame;
    a first offset bracket configured to directly couple to the first row unit bracket; and
    a first row unit, wherein the first row unit bracket is configured to directly couple to and support the first row unit, the first offset bracket is configured to directly couple to and support the first row unit, and the first offset bracket is configured to laterally offset the first row unit from the first row unit bracket to laterally offset the first row unit from a path of the track, the wheel, or the combination thereof.

2. The agricultural system of claim 1, comprising a second row unit bracket coupled to the planter frame, a second offset bracket configured to directly couple to the second row unit bracket, and a second row unit, wherein the second row unit bracket is configured to directly couple to and support the second row unit, the second offset bracket is configured to directly couple to and support the second row unit, and the second offset bracket is configured to laterally offset the second row unit from the second row unit bracket to offset the second row unit from the path of the track, the wheel, or the combination thereof.

3. The agricultural system of claim 2, wherein the first offset bracket is configured to laterally offset the first row unit in a first lateral direction and the second offset bracket is configured to laterally offset the second row unit in a second lateral direction that is opposite the first lateral direction.

4. The agricultural system of claim 1, wherein the first offset bracket comprises a first row connecting plate and a second row connecting plate.

5. The agricultural system of claim 4, wherein the first row connecting plate and the second row connecting plate couple together with a first member and a second member.

6. The agricultural system of claim 5, wherein the first row connecting plate, the second row connecting plate, the first member, and the second member define a gap configured to receive a conduit that extends between the first row unit and the planter frame.

7. The agricultural system of claim 5, wherein the first member is a first tube, and the second member is a second tube.

8. The agricultural system of claim 4, wherein the first offset bracket comprises a first bracket plate and a second bracket plate, and the first bracket plate and the second bracket plate are configured to directly couple to the first row unit bracket.

9. The agricultural system of claim 8, wherein the first row connecting plate and the second row connecting plate are laterally offset from the first bracket plate and the second bracket plate.

10. The agricultural system of claim 8, wherein the first bracket plate and the second bracket plate define first slots and second slots that are configured to receive and support a first tube and a second tube.

11. An agricultural system, comprising:
    an offset bracket configured to directly couple to a row unit bracket configured to directly couple to and support a row unit, wherein the offset bracket is configured to directly couple to the row unit and to laterally offset the row unit from a path of a track, a wheel, or a combination thereof, of the agricultural system, and the offset bracket comprises:
        a first row connecting plate;

a second row connecting plate, wherein the first row connecting plate and the second row connecting plate are configured to directly couple to the row unit;

a first bracket plate; and a second bracket plate, wherein the first bracket plate and the second bracket plate are configured to directly couple to the row unit bracket, and the first row connecting plate and the second row connecting plate are laterally offset from the first bracket plate and the second bracket plate to laterally offset the row unit from the row unit bracket, such that the row unit is laterally offset from the path of the track, the wheel, or the combination thereof.

12. The agricultural system of claim 11, wherein the offset bracket comprises a first member and a second member configured to couple the first bracket plate and the second bracket plate together.

13. The agricultural system of claim 12, wherein the first bracket plate and the second bracket plate define first slots and second slots that are configured to receive the first member and the second member.

14. The agricultural system of claim 12, wherein the first member and the second member are conduits.

15. The agricultural system of claim 11, comprising:

a planter frame;

the track, the wheel, or the combination thereof, wherein the track, the wheel, or the combination thereof, is coupled to the planter frame and configured to support the planter frame; and the row unit bracket, wherein the row unit bracket is coupled to the planter frame.

* * * * *